Dec. 19, 1967 M. C. O'DONNELL 3,359,020

SPINDLE DETENT

Filed March 7, 1966

MILES C. O'DONNELL
INVENTOR.

BY Robert W. Hampton
Steve W. Gremban
ATTORNEYS

United States Patent Office 3,359,020

Patented Dec. 19, 1967

3,359,020

SPINDLE DETENT

Miles C. O'Donnell, Rochester, N.Y., assignor to Eastman Kodak Company, Rochester, N.Y., a corporation of New Jersey Filed Mar. 7, 1966, Ser. No. 532,432
4 Claims. (Cl. 287—53)

This invention relates generally to detents, and more specifically to an improved reel holding spindle detent for a moving picture projector or the like.

It is well known in the art to provide spindle detents for releasably holding a reel on a spindle of a projector or the like. It is further known to provide a detent having diametrically opposed reel engaging ridges on opposite sides of the spindle for engaging the inner periphery of the axial, spindle receiving opening in the outer flange of the reel. The diameter of the opening is larger than the diameter of the spindle to eliminate any possible binding when the reel is slideably mounted on the spindle. A problem occurs in those situations where both flanges of the reel are provided with angularly spaced, radially extending driving slots along the inner periphery of the spindle receiving opening, and the width and length of the slots is greater than the width and height of the reel engaging ridges. With such reels, one of the reel engaging ridges of the detent may inadvertently enter a reel slot, in which case the reel will not be supported at that point. The diametrically opposed reel engaging ridge of the detent exerts pressure on the inner periphery of the spindle receiving opening with which it is in engagement. This results in tipping the reel on the spindle as a consequence of the play between the spindle and reel, causing excessive wobbling of the reel. Applicant's invention is believed to eliminate this and other disadvantages of prior known spindle detents.

This invention includes within its scope a spindle detent having a pair of spaced, registering, reel engaging ridges on a spindle for resiliently engaging the inner periphery of the spindle receiving opening. The reel engaging ridges comprise spring elements engaging a peripheral segment of the spindle receiving opening.

One of the objects of the present invention is to provide an improved spindle detent for releasably holding a reel on a spindle.

Another object of the invention is to provide an improved spindle detent that minimizes any wobble of the reel.

Another object of the invention is to provide an improved spindle detent for releasably holding a reel on a spindle, the spindle detent being of simple design and construction, thoroughly reliable and efficient in operation, and economical to manufacture.

Objects and advantages other than those set forth above will be apparent from the following description when read in connection with the accompanying drawing, in which.

Figure 1:
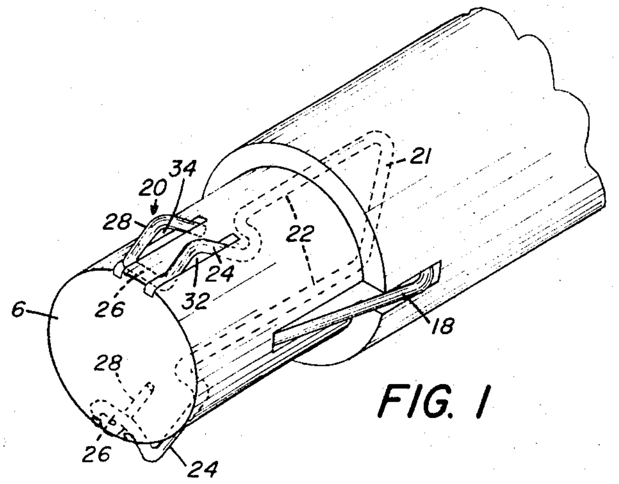
FIG. 1 is a segmental view in perspective of a spindle detent.
Figure 2:
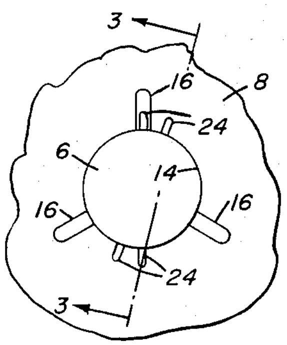
FIG. 2 is a segmental front elevation view of a reel mounted on the spindle detent of FIG. 1.
Figure 3:
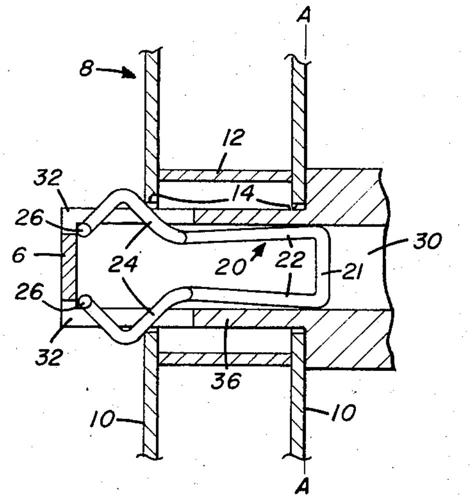
FIG. 3 is a segmental view in section taken along line 3—3 of FIG. 2.

With reference to the drawing, a spindle 6 is disclosed for rotatably supporting a projector reel 8 or the like as seen in FIG. 3. The reel 8 is of any known type having a pair of spaced flanges 10 between which a film or web, not shown, is wound onto a core 12. Each of the flanges 10 is provided with an axial opening 14 for receiving spindle 6, and drive slots 16 (see FIG. 2) radially extending from the inner periphery of reel opening 14 and angularly spaced approximately 120°. When reel 8 is mounted on spindle 6, a spring mounted drive spline 18 (see FIG. 1) on spindle 6 enters one of the drive slots 16 for driving reel 8 upon rotation of spindle 6.

The spindle 6 is provided with a detent 20 for resiliently holding reel 8 thereon in a fixed position to prevent wobbling of the reel from a plane A—A as seen in FIG. 3, which is at right angles to the axis of spindle 6. The detent 20 comprises a U-shaped wire spring member having a central bight portion 21 transverse to the axis of spindle 6 and from which outwardly sprung arms 22 extend. Each end of arm 22 is provided with an outwardly extending V-shaped ridge 24, a cross bar 26 at the end of arm 22 transverse thereto, and a V-shaped ridge 28 extending in the opposite direction of arm 22, and in register with ridge 24. The ridges 24, 28 are spaced a distance greater than the width of a drive slot 16. The spring detent is insertable in a cavity 30 of spindle 6 with ridges 24, 28 extending through respective complementary openings 32, 34 in the cylindrical wall 36 of spindle 6. The cross bars 26 engage the inner periphery of wall 36, which forms a stop for ridges 24, 28.

When reel 8 is slideably mounted on spindle 6, ridges 24, 28 of the detent are initially depressed radially inwardly by the inner periphery of the reel openings 14, and then snap radially outwardly after flange 10 has passed thereover as seen in FIG. 3. In this mounted position, ridges 24, 28 engage diametrically opposed inner peripheries of the outer flange opening 14 for holding reel 8 for rotation in the aforementioned plane A—A. If one of the ridges 24, 28 should enter a drive slot 16 as seen in FIG. 2, in those situations in which the diameter of the wire from which the spring member is made is less than the width of a drive slot 16, the remaining ridge engages the inner periphery of the flange opening 14 so that at all times at least one pair of diametrically opposed ridges will be exerting forces on the reel flange 10 for maintaining reel 8 in plane A—A with substantially no wobble.

The invention has been described in detail with particular reference to one embodiment thereof, but it will be understood that variations and modifications can be effected within the spirit and scope of the invention as described hereinabove, and as defined in the appended claims.

I claim:

1. Means for releasably holding a member having a hub on a spindle, said spindle having an axially extending bore adjacent one end thereof, means at least partially closing said bore at said one end and diametrically opposed slots formed in the spindle walls at said one end, said holding means comprising a substantially U-shaped device of resilient material movably disposed within said bore, said device having a bight extending substantially transverse to the axis of said bore, and substantially parallel legs extending from said bight toward said bore closing means, each of said legs having a portion thereof projecting radially outwardly through one of said slots, said legs terminating interiorly of said bore and adapted to engage said bore closure means with the terminal ends thereof.

2. The invention according to claim 1 wherein said U-shaped device is formed from a flexible wire.

3. The invention according to claim 1 wherein said spindle walls have diametrically opposed pairs of slots formed therein, and each of said legs have a pair of spaced portions projecting radially outwardly through one of said pairs of slots.

4. The invention according to claim 1 wherein said spindle walls have diametrically opposed pairs of slots formed therein, and each of said legs have a first ridge portion extending towards said bore closing means, a cross bar transverse to said first ridge portion and connected thereto at one end, and a second ridge portion connected to the opposite end of said cross bar and extending away from said bore closing means, said second ridge portion further being substantially parallel to said first ridge portion, said first and second ridge portions projecting radially outwardly through one of said pairs of said slots.

References Cited

UNITED STATES PATENTS

| | | | |
|---|---|---|---|
| 1,055,604 | 3/1913 | Carp | 287—52.07 |
| 1,957,884 | 5/1934 | Green | 242—68.3 |
| 2,087,002 | 7/1937 | Miehle | 242—68.3 |

CARL W. TOMLIN, *Primary Examiner.*

A. V. KUNDRAT, *Assistant Examiner.*